Aug. 30, 1966 G. AUBERT 3,268,947
MEAT CUTTING TOOL
Filed May 20, 1965
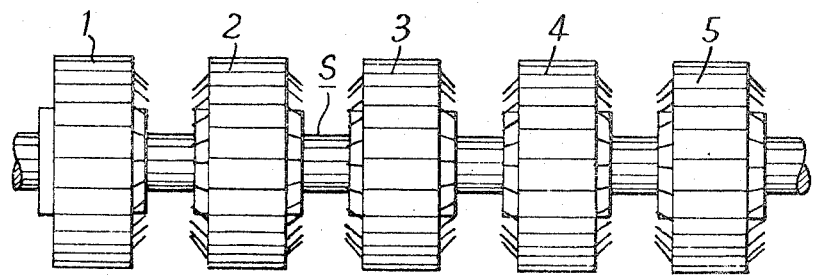
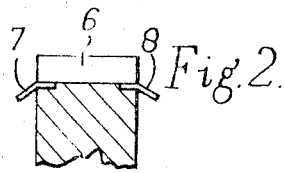
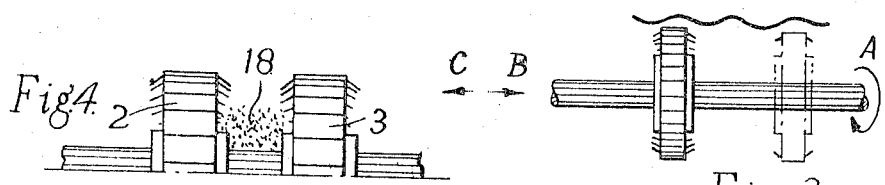
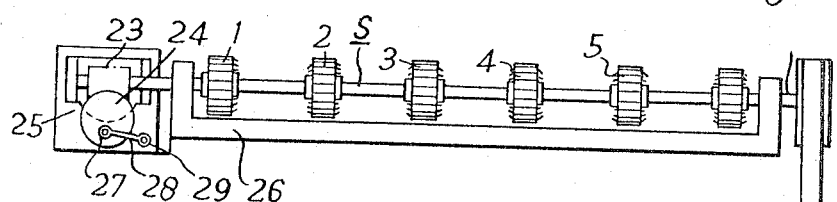
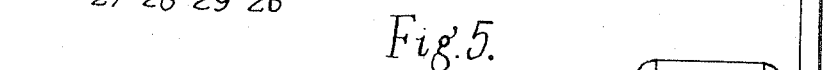
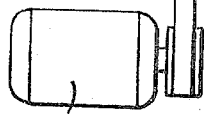
INVENTOR:
GEORGES AUBERT 3,268,947
MEAT CUTTING TOOL
Georges Aubert, 6 Rue Pierre Dupré, Marseille, France
Filed May 20, 1965, Ser. No. 457,454
Claims priority, application France, Aug. 7, 1962, 19,826,
Patent 1,330,600
1 Claim. (Cl. 17—1)

This is a continuation-in-part of my co-pending United States patent application No. 299,863, dated August 5, 1963, now abandoned.

The de-boning of quarters of butchers' meat is a complex operation which is generally effected manually by specialist personnel.

It is necessary to detach the edible portions neatly and with as little scrap as possible so that the resultant cuts may constitute saleable merchandise.

However, the diversity and varied consistency of the bone structures and the multiplicity of the anatomical features complicate the de-boning operation.

The object of the present invention is to provide apparatus for de-boning and dressing quarters of meat in the state in which they are received from the slaughter house.

According to the invention, there is provided a cylindrical cutter member having a plurality of axially spaced cylindrical cutters with discharge spaces between them. These discharge spaces are spaces into which some of the cuttings pass, as described in detail hereinafter. The cutter member has imparted to it a rotary movement combined with a reciprocatory axial movement.

An embodiment of apparatus in accordance with the invention is hereinafter particularly described by way of example with reference to the accompanying drawing, wherein:

FIG. 1 is an elevation of the cutting member incorporating individual tools.

FIG. 2 is a partial section of a single cutting tool to show the three cutting edges of the tool, the latter being one of four cutters seen in FIG. 1.

FIG. 3 is a diagram illustrating the reciprocatory axial motion of the cutter member.

FIG. 4 illustrates how the debris, i.e. cut scraps of bone and meat, passes between the individual cutting tools of the cutter member.

FIG. 5 is an elevation of the cutter member with its driving motor and means for reciprocating it axially.

The cutter member has a driving shaft S on which there are keyed cylindrical rotary cutting tools 1, 2, 3, 4 and 5.

As seen in FIG. 2, an enlarged fragmentary view of any one of the cutting tools of FIG. 1, the teeth are positioned respectively: at a first axial end face of the cutting tool 7; on the cylindrical periphery of the cutting tool 6; and at a second axial end face of the cutting tool 8.

This shaft S is capable of a rotary movement in the direction indicated by the arrow A (FIG. 3) and of a reciprocatory axial movement in the direction of arrows B, C (FIG. 3).

Referring to FIG. 5, there is seen an electric motor M which is coupled by a belt to a pulley on one end of the shaft S. The other end of the shaft S carries a worm 23 meshed with a worm wheel 24 journalled in a structure 25 connected integrally with a carriage 26 in which the shaft S rotates. The worm wheel 24 has an eccentric pin 27 coupled by a connecting rod 28 to a lug 29 mounted on any convenient fixed portion of the frame of the entire machine. As the shaft S rotates, the worm wheel 24 is rotated comparatively slowly and, by its eccentric coupling to the frame of the machine, causes the entire carriage 26 to reciprocate axially of the shaft S.

Reciprocation of the cutter member in the direction of arrows B, C not only enables the cutter to attack the entire face of the bone presented to it, but also ensures that the teeth of the cutting tools do not become blocked with debris.

The cutter member sweeps over the totality of the bony surfaces to be eliminated.

The work of breaking down the bony mass and other parts completely is extremely rapid so that production may be substantially increased and the meat may pass to the subsequent conventional chilling operation in a very much reduced period of time.

The bone meal and the scraps are recovered for any appropriate use.

I claim:

Apparatus for the mechanical boning of meat comprising:
  (a) a reciprocatably mounted carriage;
  (b) shaft means rotatably mounted on said carriage;
  (c) a plurality of cylindrical cutter tools mounted on said shaft means to rotate therewith;
  (d) each of said cutter tools being provided with a series of radially extending cutter portions, each portion having three cutting edges, the first cutting edge extending axially parallel to said shaft means and each of the other edges extending obliquely from an end of said first edge; and
  (e) means for rotating said shaft and reciprocating said carriage.

References Cited by the Examiner

UNITED STATES PATENTS

| 535,906 | 3/1895 | Johnson | 51—34 |
| 979,103 | 12/1910 | Smith | 17—3 |
| 1,927,793 | 9/1933 | De Vere | 51—34 |
| 2,195,050 | 3/1940 | Wallace. | |

FOREIGN PATENTS 226,989  10/1910  Germany.

SAMUEL KOREN, Primary Examiner.

LUCIE H. LAUDENSLAGER, Examiner.